March 13, 1951          K. D. LEGG          2,544,962
FISHING REEL CONTROL DEVICE AND BRAKE
Filed Aug. 21, 1945
*Fig. 1.*
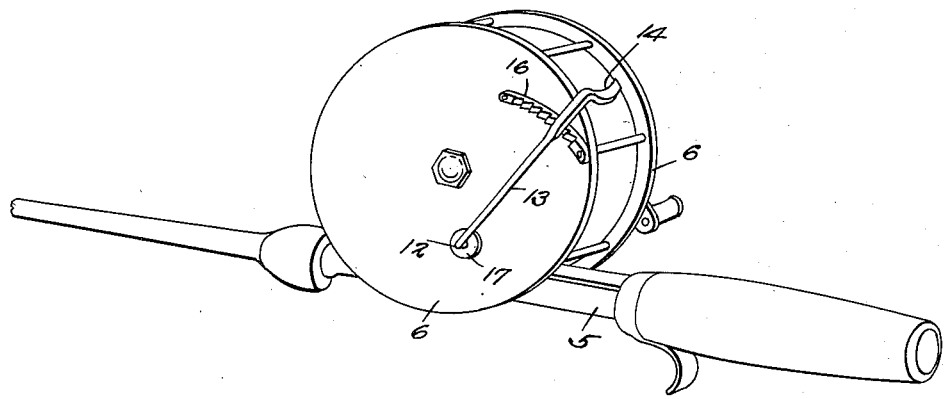
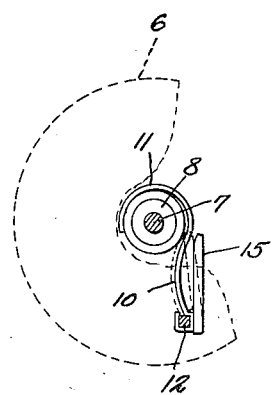
*Fig. 2.*
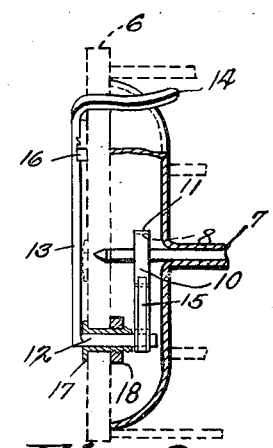
*Fig. 3.*
K. D. Legg
INVENTOR.
BY *C. A. Knowles*
ATTORNEYS.

Patented Mar. 13, 1951 2,544,962

UNITED STATES PATENT OFFICE 2,544,962

FISHING REEL CONTROL DEVICE AND BRAKE

Keith D. Legg, Minneapolis, Minn.

Application August 21, 1945, Serial No. 611,839

1 Claim. (Cl. 242—84.5)

This invention relates to fishing line reels, the primary object of the invention being to provide a fishing line reel wherein means is provided for restricting movement of the reel to eliminate back lash, which back lash is usually prevented by holding the thumb on the line wound reel and exerting pressure on the reel, which is exceptionally disagreeable, especially in cold weather.

Another object of the invention is to provide readily operable means for securing the reel against rotation.

Still another object of the invention is to provide means whereby the tension on the reel may be regulated, to control the movements of the reel, and to meet various requirement of use.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a perspective view illustrating a reel constructed in accordance with the invention, as mounted on a fishing rod.

Figure 2 is an elevational view of the device, illustrating the application of the device.

Figure 3 is a front elevational view of the device, portions of the reel housing being shown in dotted lines.

Referring to the drawing in detail, the reference character 5 indicates the handle of a fishing rod, on which a fishing line reel is mounted. The reference character 6 indicates the side members of a fishing line reel, and the reference character 7 indicates the shaft of the reel, which is mounted in suitable bearings, the reference character 8 representing the brake drum, which is secured to the shaft 7 adjacent to one end thereof.

The braking mechanism, forming the essence of the present invention, includes a spring arm 10 which has a curved end 11, constituting a brake band which is curved to fit around a major portion of the brake drum 8, as shown by Fig. 2 of the drawing. The arm 10 is secured to the shaft 12 which extends through one of the side members of the reel frame, the outer end of the shaft 12 being formed into an arm 13 which has its free end flattened and curved as at 14, providing a thumb piece which extends inwardly over the reel in a manner to clear the outer edge of the side member, through which it extends.

This arm 13 acts as a brake band setting arm, and may be actuated to rotate the shaft 12, setting the initial position of the brake band 9.

Secured to the shaft 12, is a pressure arm 15 which is so disposed that when the arm is moved in one direction, it will contact with the spring arm 10 and force the spring arm into engagement with the band 8 setting up friction in addition to the normal action of the curved end of the arm 10 to retard the rotary movement of the band and shaft to which the band is secured. This movement of the arm 15 and spring arm 10 is clearly shown in dotted lines in Fig. 2 of the drawing.

The reference character 16 indicates a rack bar which is secured to the outer surface of the side plate through which the shaft 12 extends, and is so arranged that the arm 13 will engage the teeth of the rack bar to hold the arm 13 in various positions of adjustment, to tension the spring arm 10. It will of course be understood that the arm 13 is constructed of semi-rigid material, so that it will bend slightly to permit of the movement of the arm 13 over the rack bar. Upon casting, should it be desired to somewhat restrict the rotary movement of the reel, the arm 13 is moved to put the desired pressure on the spring arm 10 and shaft of the reel to prevent back lash, during casting.

Should it be desired to lock the reel against rotary movement, the arm 13 will of course be moved to the desired tooth of the rack bar to create sufficient pressure against the spring arm 10 to set up a binding action between the band 8 and spring arm. As the shaft 12 is rotated in one direction, the arm 15 is forced against the spring arm to create this pressure.

As shown by Fig. 3 of the drawing, the shaft 12 extends through the bushing 17 which is positioned in an opening of the reel frame, and held in position by means of the thread tap 18.

In view of the foregoing detailed disclosure, it is believed that further description of the operation of the device is unnecessary.

What is claimed is:

The combination in a fishing reel having a side member and a shaft connected with a spool, of a brake comprising a brake drum secured to said shaft, a yieldable spring arm having a curved end curved around the brake drum, a shaft extending through a side member of the reel and to which said spring arm is secured, a pressure arm secured to the shaft in direct alignment with the spring arm, adapted to engage the spring arm urging the curved end of the spring arm into contact with the drum, an operating arm formed at one end of said shaft, the free end of said operating arm being formed into a thumb piece extended over the reel, and being actuated by pressure directed thereto by the thumb of the person using the reel, and a ratchet bar engageable by said operating arm, holding the operating arm in its adjusted positions.

KEITH D. LEGG.

REFERENCES CITED

The following references are of record in the file of this patent:

UNITED STATES PATENTS

| Number | Name | Date |
|---|---|---|
| 756,364 | Hermance | Apr. 5, 1904 |
| 837,080 | Latta | Nov. 27, 1906 |
| 2,184,149 | Marr | Dec. 19, 1939 |

FOREIGN PATENTS

| Number | Country | Date |
|---|---|---|
| 150,323 | Austria | Mar. 15, 1937 |
| 446,598 | Great Britain | May 4, 1936 |
| 469,385 | France | July 30, 1914 |